E. BOZARTH.
WHEEL.
APPLICATION FILED MAR. 16, 1909.
945,688.
Patented Jan. 4, 1910.
2 SHEETS—SHEET 1.
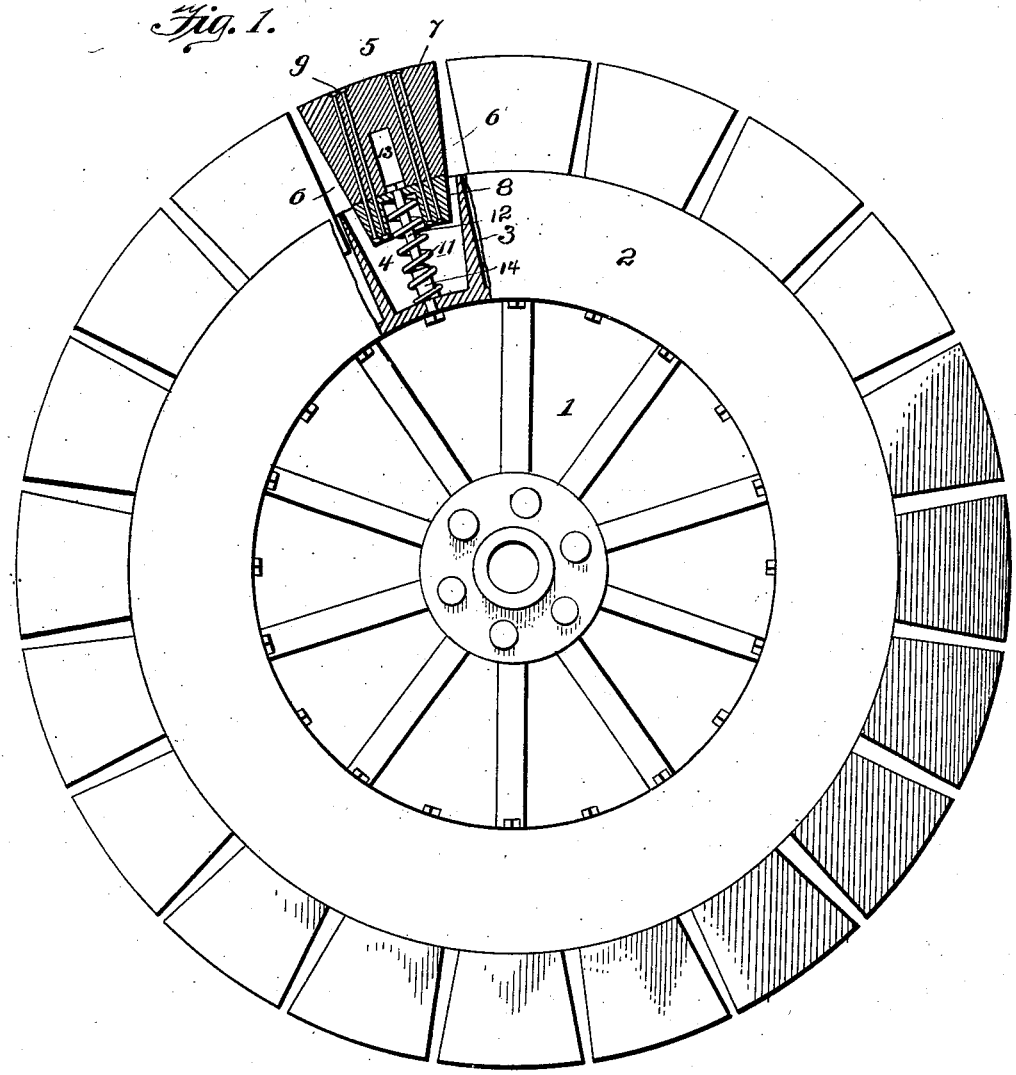
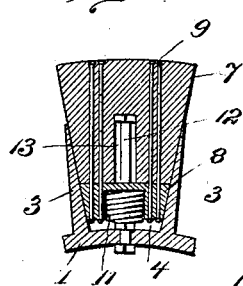
Witnesses
G. L. Jobson
J. W. Garner
Inventor
Elihu Bozarth.
By Victor J. Evans
Attorney

E. BOZARTH.
WHEEL.
APPLICATION FILED MAR. 16, 1909.

945,688.

Patented Jan. 4, 1910.
2 SHEETS—SHEET 2.

Witnesses

Inventor
Elihu Bozarth.
By Victor J. Evans
Attorney

UNITED STATES PATENT OFFICE.

ELIHU BOZARTH, OF ALVIN, ILLINOIS.

WHEEL.

945,688.  Specification of Letters Patent.  Patented Jan. 4, 1910.

Application filed March 16, 1909. Serial No. 483,702.

*To all whom it may concern.*

Be it known that I, ELIHU BOZARTH, a citizen of the United States, residing at Alvin, in the county of Vermilion and State of Illinois, have invented new and useful Improvements in Wheels, of which the following is a specification.

This invention relates to improvements in wheels for automobiles and other vehicles and consists in the construction, combination and arrangement of devices hereinafter described and claimed; the object of the invention being to provide an improved form of wheel which secures the same results as the rubber tired wheel and enables rubber tires to be dispensed with.

Figure 2:
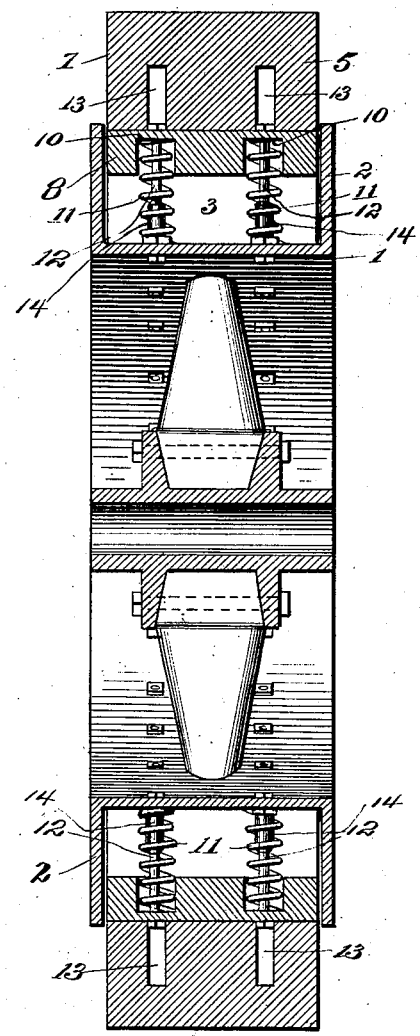
Figure 4:

In the accompanying drawings: Figure 1 is partly an elevation and partly a sectional view of a wheel having a tire constructed in accordance with my invention. Fig. 2 is a transverse sectional view of the same. Fig. 3 is a detail sectional view of one of the radial movable blocks and a portion of the tire. Fig. 4 is a detail elevation of one of the bolts on which the blocks operate, a sleeve on said bolt being shown partly in section.

In accordance with my invention I provide a tire or rim 1, which is made of iron or steel, with guard flanges 2 at its sides which are here shown as formed integrally therewith and with transverse partitions 3 which connect the said guard flanges and are also shown as formed integrally with the tire and the guard flanges. The said partitions have their opposing sides inclined and converging toward the center of the wheel and it will be understood that by thus constructing a tire or rim the same is provided with outwardly opening radially disposed recesses or chambers 4.

Radially movable blocks 5 operate and are disposed in the said recesses. The said blocks have their sides which oppose the inclined sides of the partition 3 similarly inclined as at 6 so that when the said blocks are forced inwardly into the said recesses 4 their inner ends fit snugly in said recesses as shown in Fig. 3. Each of the said blocks is here shown as comprising an outer section 7 which is preferably made of hard wood but which may be made of any other suitable material, and an inner section 8 which is secured to the said outer section by means of bolts 9. The said inner section is preferably made of iron or steel and is provided with recesses 10 for the reception of coil springs 11. The said springs are placed on radially disposed bolts 12 and bear between the tire or rim and the blocks 5 and serve to move the blocks outwardly, and the outer sections of the blocks are provided with radially disposed recesses 13 for the reception of the outer ends of the bolts 12. Sleeves 14, fixed on said bolts enter and guide the springs when the said blocks are moved inwardly as shown in Fig. 3.

The radially movable blocks are thus mounted on springs and constitute the tread elements of the wheel and successively engage the earth and sustain the weight of the wheel and the vehicle as the wheel revolves and the vehicle progresses. It will be understood that the said tread elements are yieldably mounted and connected to the rim of the wheel so that they serve to absorb shocks and enable the vehicle to ride smoothly and evenly and render it independent of inequalities in the road surface.

I claim:—

A wheel of the class described having a rim provided with outwardly opening radial recesses, tread blocks disposed for operation in said recesses and each comprising a metallic inner section and a wooden outer section bolted to said inner section, said inner section having recesses on its inner side and said outer section having recesses in line with those of the inner section, bolts attached to the rim extending through the inner block sections and having heads disposed for operation in the recesses of the outer block sections and springs on said bolts projecting said blocks outwardly, said springs bearing between the rim and the recesses in the inner block sections and having their outer ends in said recesses.

In testimony whereof I affix my signature in presence of two witnesses.

ELIHU BOZARTH.

Witnesses:
C. E. BIRKY,
BERTHA BOZARTH.